Jan. 25, 1944. L. A. KILGORE 2,340,059
VAPOR ELECTRIC DEVICE
Filed July 19, 1940

WITNESSES:

INVENTOR
Lee A. Kilgore.
BY
ATTORNEY

Patented Jan. 25, 1944

2,340,059

UNITED STATES PATENT OFFICE 2,340,059

VAPOR ELECTRIC DEVICE

Lee A. Kilgore, Forest Hills, Pa., assignor to Westinghouse Electric & Manufacturing Company, East Pittsburgh, Pa., a corporation of Pennsylvania Application July 19, 1940, Serial No. 346,246

15 Claims. (Cl. 175—363)

My invention relates to a vapor electric device and particularly to a control system for applying make-alive impulses to the make-alive electrodes of vapor electric valves.

In the operation of vapor electric converters of the make-alive type, it has heretofore been customary to utilize auxiliary thermionic valves or mechanical switching devices to apply the necessary periodic impulses for initiating the conducting intervals in the valves. The heretofore known impulsing systems have had the disadvantages in that the thermionic control valves were of short life and required periodic replacement to secure satisfactory operation of the converter and the mechanical switching devices frequently burned out the contacts or otherwise became disarranged.

In the control system according to my invention the periodic impulses are supplied by means of an impulse generator of the dynamo-electric type having a special winding arrangement for producing impulse currents having high narrow positive impulses or so-called peaked wave impulses and a relatively low long-time negative impulse or so-called flat wave form. This distorted wave form is secured by providing an exciting or field element having a very narrow exciting pole and a wide return pole surface. The winding for producing the impulse is also of a special form having one side of all of the windings concentrated in a single winding slot and the opposite sides of the windings distributed in a plurality of slots to produce the desired wave form as described. The impulse generator is driven at synchronous speed by any suitable motor preferably of the synchronous type.

It is accordingly an object of my invention to produce an impulse generator providing a distorted wave form.

It is a further object of my invention to provide a control system in which the distorted wave form of my impulse generator is applied to control a make-alive type converter.

Figure 1:
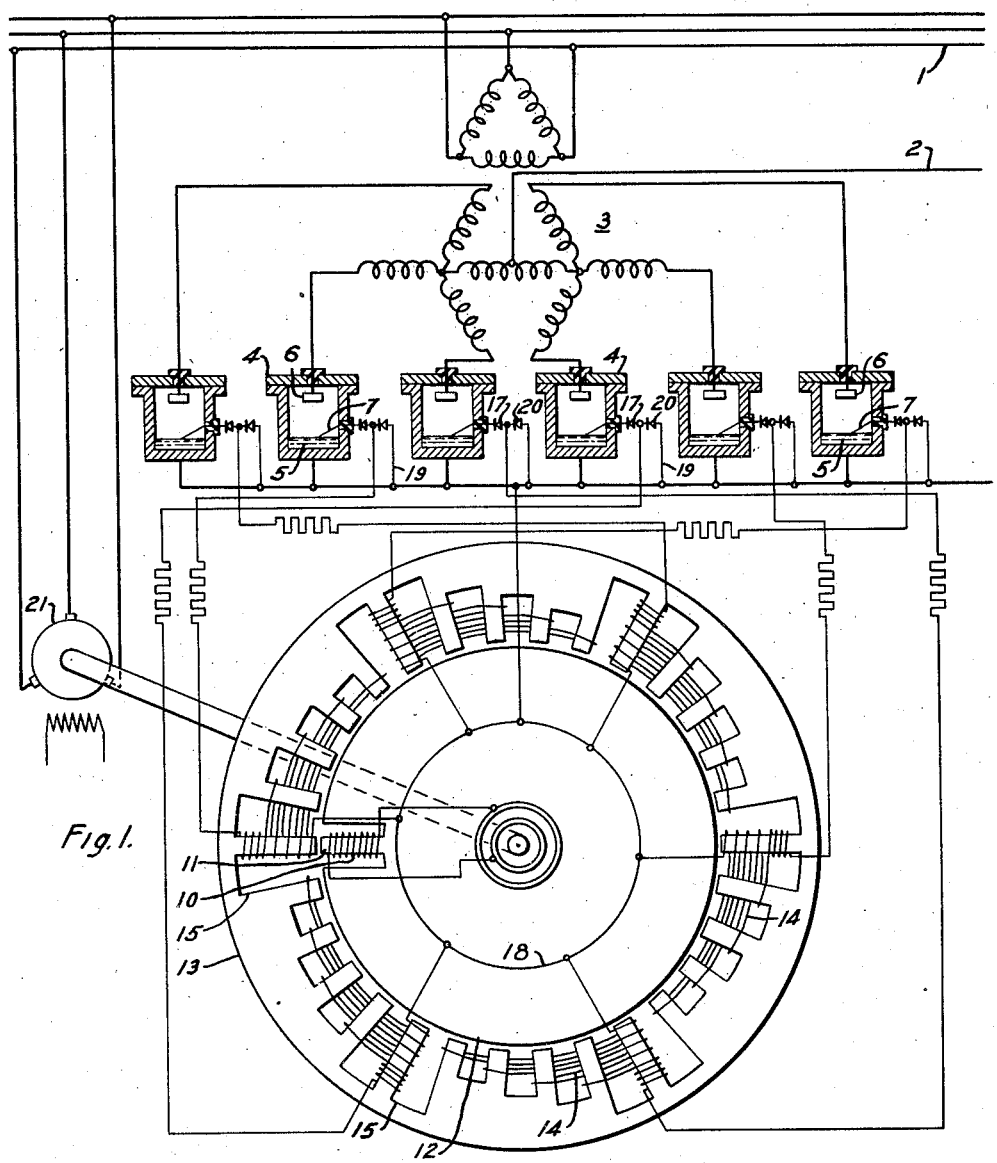
Figure 2:
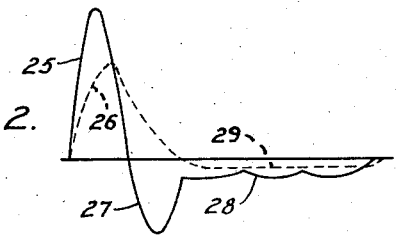

Other objects and advantages of my invention will be apparent from the following detailed description taken in conjunction with the accompanying drawing in which:

Figure 1 is a schematic illustration of a vapor electric converter utilizing my invention, and Fig. 2 is a diagrammatic illustration of the current and voltage waves produced by my improved control system.

In the exemplary embodiment of my invention, an alternating current circuit 1 and direct current circuit 2 are connected by means of a suitable transformer 3, the flow of current through the transformer 3 being controlled by the make-alive type valves 4, each of the valves 4 including a vaporizable cathode 5 of suitable material such as mercury, a cooperating anode 6 and a make-alive electrode 7.

The impulse generator according to my invention comprises a field member having a concentrated field winding 10 associated with a relatively narrow-faced pole element 11 and a relatively large-faced pole return 12. The armature 13 of the impulse generator carries a plurality of star connected sections 14 preferably at least as great in number as the make-alive electrode 7 to be operated. Each impulse generating section 14 comprises a winding distributed over a sector of the armature surface and comprises a plurality of winding turns, one side of all of the turns of the windings being concentrated preferably in a single armature slot 15 or at least so grouped that all turns are substantially simultaneously subject to the flux from the narrow pole face 11, and the opposite sides of these turns being distributed throughout a plurality of slots. Preferably approximately half of the return turns are located in a single slot while the remaining turns are distributed evenly throughout a plurality of slots. The phase terminals of the windings 14 are connected to the several make-alive electrodes 7 preferably through suitable unidirectional conductors 17 while the star point 18 of the windings 14 are connected to the cathodes 5 of the valves 4. Preferably a return or shunt connection 19 is provided for the inverse impulse wave. A suitable unidirectional conductor 20 is provided in the shunt connection 19.

A suitable driving motor 21 is provided for rotating the impulse generator in synchronism with the impulses applied to the anodes 6 of the make-alike type valves 4. Preferably a motor of the synchronous type is utilized which may be connected to any suitable in-phase source such as the alternating current circuit 1.

In the operation of the control system according to my invention, the impulse generator is rotated at synchronous speed so that the concentrated pole 11 successively energizes the various armature windings 14. Thus when the concentrated flux from the pole 11 cuts the one side of the windings, a sharp voltage impulse 25 is generated. This impulse 25 produces a current impulse 26 also of rapidly rising characteristic and at the end of the impulse period it is desirable to reduce the impulse 26 rapidly to a very low value. This is accomplished as the exciting pole 11 passes approximately half of the return turns of the impulse winding 14, thus producing a rapidly decreasing negative peak 27 of potential, and as the impedance of the circuit is considerable the current 24 is rapidly reduced to zero. As the exciting pole 11 passes the successive distributed return turns, a relatively low inverse potential 28 is produced which produces a relatively low inverse current 29 extending over a considerable interval of time. The unidirectional conductor 17 in series with the make-alive electrode 7 permits the peak potential of the positive impulse 25 to be applied to the make-alive electrode 8 and blocks the inverse potential 27 which flows through the return circuit 19 and its associated unidirectional conductor 20.

While for purposes of illustration I have shown and described a specific embodiment of my invention, it will be apparent that changes and modifications can be made therein without departing from the true spirit of my invention or the scope of the appended claims.

I claim as my invention:

1. In a vapor electric conversion system having a plurality of make-alive type valves, a control system comprising a make-alive electrode for each of said valves, an impulse generator for producing a non-symmetrical exciting potential and means including a unidirectional conductor for applying a positive impulse of said potential to the make-alive electrode and a by-pass including a unidirectional conductor for blocking the inverse potential out of the make-alive electrode.

2. In combination, an ignitron having a cathode and an ignition electrode, means interconnecting said cathode and said ignition electrode and including at least a first rectifier and a second rectifier connected to conduct current from said cathode to said ignition electrode, current conducting means for supplying ignition current to said ignition electrode connected to the electrical junction between said rectifiers and said cathode and means for supplying current to said conducting means.

3. Apparatus according to claim 2 characterized by the fact that the rectifiers are of the dry type.

4. In combination, an ignitron having a cathode and an ignition electrode, means interconnecting said cathode and said ignition electrode and including a stack of dry rectifiers connected to conduct current from said cathode to said ignition electrode, current conducting means for supplying ignition current to said ignition electrode connected to a point intermediate the ends of said stack and said cathode and means for supplying current to said conducting means.

5. In combination, an electric discharge device having a cathode and a control electrode, means interconnecting said cathode and said control electrode and including at least a first rectifier and a second rectifier connected to conduct current from said cathode to said control electrode, current conducting means for supplying control current to said control electrode connected to the electrical junction between said rectifiers and said cathode and means for supplying current to said conducting means.

6. In combination, a make-alive type valve having a cathode and a make-alive electrode, means interconnecting said cathode and said make-alive electrode and including at least a first rectifier and a second rectifier connected to conduct current from said cathode to said make-alive electrode, current conducting means connected to the electrical junction between said rectifiers and said cathode for supplying control current to said make-alive electrode and impulsing means for supplying current to said conducting means.

7. A control system for a vapor-electric converter having a plurality of make-alive type valves comprising an impulse generator including a field member having a concentrated pole face and a large cooperating pole face, an armature comprising a plurality of star-connected sections, each of said sections having a winding composed of a plurality of winding turns, one side of said turns being concentrated in a single winding slot and the opposite side of said turns being distributed through a plurality of slots, a cathode and a make-alive electrode in each of said valves, a connection from the star point of said armature to the cathodes of said valves, and connections from the respective windings to the respective make-alive electrodes, connections between said cathodes and the respective make-alive electrodes, a plurality of rectifying elements in said connection, said winding being connected intermediate of said rectifying elements.

8. In combination, a make-alive type valve, a cathode and a make-alive electrode in said valve, a connection in shunt with said cathode and said make-alive electrode, at least two unidirectional conducting elements in said shunt connection, said elements being connected to conduct current from said cathode to said make-alive electrode, a source of control potential and connections from said source of control potential to said cathode and to a point intermediate said elements.

9. In combination, a make-alive type valve, a cathode and a make-alive electrode in said valve, a connection in shunt with said cathode and said make-alive electrode, at least two unidirectional conducting elements in said shunt connection, said elements being connected to conduct current from said cathode to said make-alive electrode, an impulsing device and means for connecting the potential of said impulsing device between the cathode and a point intermediate the unidirectional conducting elements.

10. In combination, an electric discharge device having a cathode and a control electrode, means interconnecting said cathode and said control electrode and including at least a first rectifier and a second rectifier connected to conduct current from said cathode to said control electrode, a source of control potential and means for impressing the potential of said source between the cathode and the electrical junction between said rectifiers.

11. In combination, an electric discharge device having a cathode and a control electrode, means interconnecting said cathode and said control electrode and including at least a first rectifier and a second rectifier connected to conduct current from said cathode to said control electrode, an impulse generator including a field member for producing a concentrated field at one pole face and a distributed field at another pole face, a winding having a plurality of turns, one side of said turns being bunched for substantially simultaneous energization and the other sides being distributed and connections for impressing the potential of said winding between the cathode and the electrical junctions between said rectifiers.

12. In a control system for a vapor electric device, a cathode in said device, a control electrode in contact with said cathode, an electrical connection to said control electrode, a unidirectional conductor connected in series with said connection, a shunt circuit connected around said cathode, said control electrode and said first-mentioned unidirectional conductor, and a second unidirectional conductor in said shunt circuit.

13. In a control system for a vapor electric device, a cathode in said device, a control electrode in contact with said cathode, an electrical connection to said control electrode, a unidirectional conductor connected in series with said connection, a shunt circuit connected around said cathode, said control electrode and said first-mentioned unidirectional conductor, and a second unidirectional conductor in said shunt circuit, and means for impressing a control potential between said cathode and a point intermediate the unidirectional conductor.

14. In combination, an ignitron having a cathode and an ignition electrode, means interconnecting said cathode and said ignition electrode and including at least a first rectifier and a second rectifier connected to conduct current from said cathode to said ignition electrode, current conducting means for supplying ignition current to said ignition electrode connected to the electrical junction between said rectifiers and said cathode and means for supplying current of both positive and negative polarity to said conducting means.

15. In combination, a ignitron having an ignition electrode and a cathode, means for generating potential impulses, each impulse having first one polarity and a predetermined amplitude and then the opposite polarity and a substantially smaller amplitude, means for impressing said impulses across said ignition electrode and said cathode in such manner that when said impulses have said first polarity they cause current to flow from said ignition electrode to said cathode, and means for suppressing current flow from said cathode to said ignition electrode when said impulses have said opposite polarity.

LEE A. KILGORE.

DISCLAIMER 2,340,059.—*Lee A. Kilgore*, Forest Hills, Pa. VAPOR ELECTRIC DEVICE. Patent dated January 25, 1944. Disclaimer filed November 25, 1944, by the assignee, *Westinghouse Electric & Manufacturing Company*.

Hereby enters this disclaimer to claim 4 of said patent.

[*Official Gazette December 26, 1944.*]